US011822735B2

(12) United States Patent
Lai et al.

(10) Patent No.: US 11,822,735 B2
(45) Date of Patent: Nov. 21, 2023

(54) ELECTRONIC DEVICE AND METHOD OF CONTROLLING MULTIPLE PIECES OF EQUIPMENT

(71) Applicant: Aten International Co., Ltd., New Taipei (TW)

(72) Inventors: Pei-Chun Lai, New Taipei (TW); Kuo-Feng Kao, New Taipei (TW); Chia-Hao Chen, New Taipei (TW)

(73) Assignee: Aten International Co., Ltd., New Taipei (TW)

( * ) Notice: Subject to any disclaimer, the term of this patent is extended or adjusted under 35 U.S.C. 154(b) by 2 days.

(21) Appl. No.: 17/860,104

(22) Filed: Jul. 8, 2022

(65) Prior Publication Data

US 2023/0095001 A1 Mar. 30, 2023

(30) Foreign Application Priority Data

Sep. 29, 2021 (TW) ................. 110136194

(51) Int. Cl.
*G09G 5/00* (2006.01)
*G06F 3/023* (2006.01)
(Continued)

(52) U.S. Cl.
CPC ............ *G06F 3/0238* (2013.01); *A63F 13/24* (2014.09); *G06F 13/382* (2013.01);
(Continued)

(58) Field of Classification Search
CPC ...... G06F 3/0231; G06F 3/0238; G06F 3/041; G06F 13/382; G06F 13/4282;
(Continued)

(56) References Cited

U.S. PATENT DOCUMENTS

| 10,936,086 B2 | 3/2021 | Park et al. |
| 2004/0039950 A1 | 2/2004 | Okamoto et al. |

(Continued)

FOREIGN PATENT DOCUMENTS

| CN | 102043742 A | * 5/2011 | ........... G06F 13/385 |
| CN | 211857464 | 11/2020 | |

(Continued)

OTHER PUBLICATIONS

"Office Action of Taiwan Counterpart Application", dated Jul. 21, 2022, p. 1-p. 7.

*Primary Examiner* — Joe H Cheng
(74) *Attorney, Agent, or Firm* — JCIPRNET

(57) ABSTRACT

An electronic device and a method of controlling multiple pieces of equipment are provided. The electronic device is coupled to an operating device, a first controlled device and a second controlled device. The electronic device includes an operating interface and a controlled interface. The operating interface is coupled to the operating device. The operating device includes a first operating area and a second operating area. The first operating area is configured to deliver a first operating signal. The second operating area is configured to deliver a second operating signal. The controlled interface is coupled to the first controlled device and the second controlled device. The first controlled device is controlled by the first operating signal. The second controlled device is controlled by the second operating signal.

10 Claims, 5 Drawing Sheets

(51) Int. Cl.
  *G06F 13/42*  (2006.01)
  *G06F 13/38*  (2006.01)
  *A63F 13/24*  (2014.01)

(52) U.S. Cl.
  CPC ........ *G06F 13/4282* (2013.01); *G06F 3/0231* (2013.01); *G06F 2213/0002* (2013.01); *G06F 2213/0042* (2013.01)

(58) Field of Classification Search
  CPC .... G06F 2213/0002; G06F 2213/0042; G09G 5/00; A63F 13/23; A63F 13/24; A63F 13/85
  See application file for complete search history.

(56) References Cited

U.S. PATENT DOCUMENTS

| | | | | |
|---|---|---|---|---|
| 2007/0130371 | A1* | 6/2007 | Chung | G06F 3/038 710/1 |
| 2008/0192003 | A1* | 8/2008 | Kondo | G06F 3/0231 345/156 |
| 2010/0097326 | A1* | 4/2010 | Liang | G06F 3/023 345/173 |
| 2010/0306715 | A1* | 12/2010 | Geisner | G06F 3/014 345/157 |
| 2011/0029896 | A1* | 2/2011 | Cheng | G06F 3/023 710/73 |
| 2011/0083108 | A1* | 4/2011 | Klein | G06F 3/0481 715/859 |
| 2011/0225537 | A1* | 9/2011 | Wang | G06F 1/181 715/778 |
| 2012/0327299 | A1* | 12/2012 | Shen | H04N 7/108 348/E5.009 |
| 2016/0066057 | A1* | 3/2016 | Kao | H04N 21/6112 725/127 |
| 2016/0121225 | A1* | 5/2016 | Kao | A63F 13/327 463/31 |
| 2018/0039595 | A1* | 2/2018 | Kao | G06F 13/385 |
| 2020/0209982 | A1* | 7/2020 | Kao | G01S 1/70 |
| 2021/0011597 | A1 | 1/2021 | Ghassabian | |

FOREIGN PATENT DOCUMENTS

| | | |
|---|---|---|
| GN | 107179834 | 9/2017 |
| TW | 201017415 | 5/2010 |
| TW | 201426311 | 7/2014 |
| TW | I476591 | 3/2015 |
| TW | I489368 | 6/2015 |

* cited by examiner

ELECTRONIC DEVICE AND METHOD OF CONTROLLING MULTIPLE PIECES OF EQUIPMENT

CROSS-REFERENCE TO RELATED APPLICATION

This application claims the priority benefit of Taiwan application serial no. 110136194, filed on Sep. 29, 2021. The entirety of the above-mentioned patent application is hereby incorporated by reference herein and made a part of this specification.

BACKGROUND

Technical Field

The invention relates to an electronic device and a control method, and particularly relates to an electronic device capable of operating multiple pieces of equipment and a method of controlling multiple pieces of equipment.

Description of Related Art

Users often like to control multiple hosts at the same time. For example, when playing games through home game consoles (such as PlayStation (PS) and Switch), a user often wants to satisfy his/her needs, such as searching for game clearance tips, playing audio-video information, and the like on the Internet through a personal computer or a laptop computer at the same time. However, the hosts (such as the home game console, the personal computer, the laptop computer, and the like.) are likely to be connected to a same monitor, and the user often wants to use a same set of operating devices (such as a same set of keyboard and mouse) to control these hosts.

Therefore, a special control device (for example, a keyboard-video-mouse (KVM) switch) for switching the hosts and the operating device is required to switch the host to be controlled, so as to control different hosts through the same set of input devices. However, the KVM switch may only allow the user to control one of the hosts before and after the switch.

SUMMARY

The invention is directed to an electronic device, which is capable of using a single operating device to control multiple controlled devices at the same time, so as to improve the use efficiency of the controlled devices and enhance user's operation fluency.

An embodiment of the invention provides an electronic device coupled to an operating device, a first controlled device and a second controlled device. The electronic device includes an operating interface and a controlled interface. The operating interface is coupled to the operating device. The operating device includes a first operating area and a second operating area. The first operating area is configured to deliver a first operating signal. The second operating area is configured to deliver a second operating signal. The controlled interface is coupled to the first controlled device and the second controlled device. The first controlled device is controlled by the first operating signal. The second controlled device is controlled by the second operating signal.

An embodiment of the invention provides a method of controlling multiple pieces of equipment adapted for an electronic device coupled to an operating device, a first controlled device and a second controlled device. The method includes: determining whether to receive one or a combination of a first operating signal and a second operating signal from the operating device, where the operating device includes a first operating area and a second operating area, the first operating area is configured to deliver the first operating signal, and the second operating area is configured to deliver the second operating signal; and providing the first operating signal to the first controlled device, and providing the second operating signal to the second controlled device. The first operating signal is compatible and configured to control the first controlled device. The second operating signal is compatible and configured to control the second controlled device.

Based on the above description, the electronic device and the method of controlling multiple pieces of equipment in the embodiments of the invention divide a plurality of button zones on the operating device (for example, an input device with multiple buttons, such as a keyboard, a mouse, etc.) into multiple operating areas, so that the operating signals generated by these operating areas on the operation device are respectively provided to the corresponding controlled devices through conversion of the electronic device, so as to control these hosts to perform different operations at the same time. For example, the user may press a button in the first operating area to control the first controlled device to move a game character, and simultaneously press a button in the second operating area to control the second controlled device to play/pause a multimedia video. In this way, the embodiments of the invention may improve the use efficiency of controlling multiple controlled devices, and may improve the user's operation fluency to enhance the user experience.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
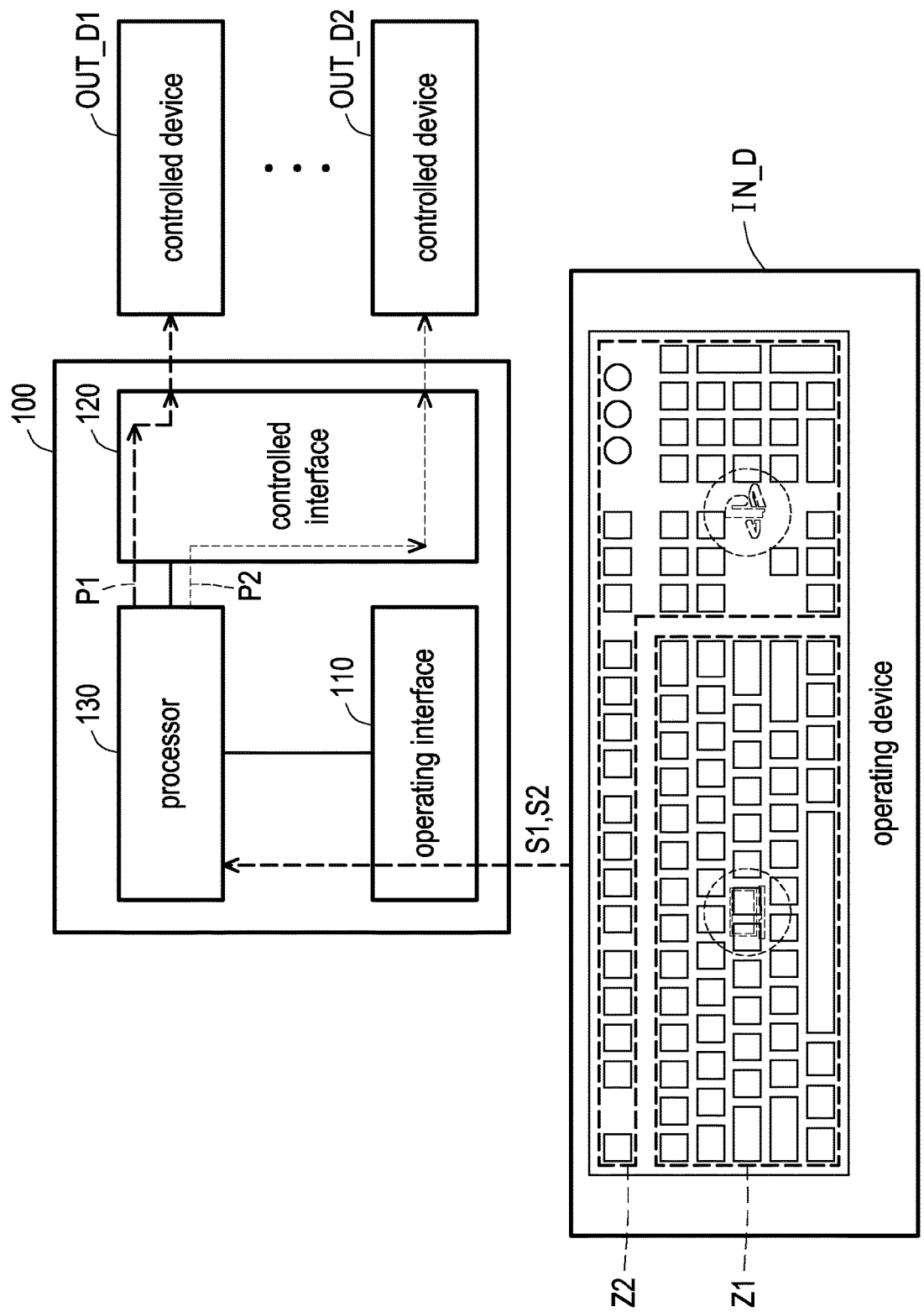
FIG. 1 is a block diagram of an electronic device according to an embodiment of the invention.

Reference will now be made in detail to the present preferred embodiments of the invention, examples of which are illustrated in the accompanying drawings. Wherever possible, the same reference numbers are used in the drawings and the description to refer to the same or like parts. Theses exemplary embodiments are only a part of the disclosure, and the disclosure does not disclose all of the implementations. More precisely, these exemplary embodiments are only examples of the system and method in the claims of the disclosure.

Referring to FIG. 1, FIG. 1 is a block diagram of an electronic device according to an embodiment of the invention. In the embodiment, an electronic device 100 is coupled to an operating device IN_D and a plurality of controlled devices OUT_D1 to OUT_D2. The electronic device 100 includes an operating interface 110 and a controlled interface 120. The operating interface 110 is coupled to the controlled interface 120.

In the embodiment, the operating interface 110 is coupled to the operating device IN_D. The operating device IN_D has multiple operating areas Z1-Z2. The operating area Z1 is used to deliver an operating signal S1 to the operating interface 110. The operating area Z2 is used to deliver an operating signal S2 to the operating interface 110.

In the embodiment, the controlled interface 120 is coupled to the controlled devices OUT_D1 and OUT_D2. The controlled interface 120 respectively outputs the operating signals S1 and S2 to the controlled devices OUT_D1 and OUT_D2. The controlled device OUT_D1 is controlled by the operating signal S1 to perform a corresponding operation according to the operating signal S1. The controlled device OUT_D2 is controlled by the operating signal S2 to perform a corresponding operation according to the operating signal S2.

For example, the controlled device OUT_D1 is a computer host and is loaded with communication software. The controlled device OUT_D2 is a game console (for example, PlayStation; PS, XBOX or Switch, etc.) and is loaded with game software. When the user has controlled the controlled device OUT_D2 to execute the game software through the operating area Z2, the user may deliver the operating signal S1 through the operating area Z1 to instruct the controlled device OUT_D1 to execute the communication software. Therefore, the user may experience the game software in the controlled device OUT_D2 and meanwhile experience the communication software in the controlled device OUT_D1.

The operating device IN_D may be an input device including, for example, a microphone, a touchpad, a stylus, a mouse, or a keyboard. The controlled devices OUT_D1 and OUT_D2 may be host devices used to run an operating system and/or other applications, including, for example, a tablet computer, a notebook computer, a desktop computer, or a game console, etc.

The number of the operating areas Z1, Z2, the controlled devices OUT_D1, OUT_D2, and the corresponding operating signals S1, S2 in the embodiment is only an example, and is not limited to the number shown in the embodiment. In other words, the operating device IN_D of the embodiment may have two, three or more operating areas, and the number of the controlled devices coupled to the electronic device 100 in the embodiment may be more than two.

It should be noted that the electronic device 100 may respectively transmit the operating signals S1, S2 output by the different operating areas Z1, Z2 to the corresponding controlled devices OUT_D1, OUT_D2, so that the controlled devices OUT_D1, OUT_D2 perform the corresponding operations. In this way, the electronic device 100 does not need to switch the operating signals S1 and S2, and control the corresponding controlled device OUT_D1 or OUT_D2 according to one of the operating signals S1 and S2. Therefore, the electronic device 100 may control multiple controlled devices OUT_D1 and OUT_D2 at the same time, so as to improve the use efficiency of the controlled devices OUT_D1 and OUT_D2 and the user's operation fluency to enhance the user experience.

Referring to FIG. 1 again, the electronic device 100 further includes a processor 130. In the embodiment, the processor 130 is coupled to the operating interface 110 and the controlled interface 120. The processor 130 receives the operating signals S1 and S2 through the operation end interface 110. The processor 130 converts the operating signal S1 into a control signal compatible to the controlled device OUT_D1. The processor 130 converts the operating signal S2 into a control signal compatible to the controlled device OUT_D2. In addition, the processor 130 outputs the converted operating signals S1, S2 to the corresponding controlled devices OUT_D1, OUT_D2 through the controlled interface 120.

To be more specific, there is an operating signal transmission path P1 between the processor 130 and the controlled device OUT_D1 to transmit the operating signal S1 and the control signal converted according to the operating signal S1. Similarly, there is an operating signal transmission path P2 between the processor 130 and the controlled device OUT_D2 to transmit the operating signal S2 and the control signal converted according to the operating signal S2. The operating device IN_D simultaneously and separately controls the controlled devices OUT_D1 and OUT_D2 through the operating signal transmission paths P1 and P2.

The processor 130 is, for example, a central processing unit (CPU), or other programmable general-purpose or special-purpose microprocessors or a digital signal processor (DSP), a programmable controller, application specific integrated circuits (ASIC), a programmable logic device (PLD) or other similar devices or a combination of these devices, which may load and execute computer programs.

Figure 2A:
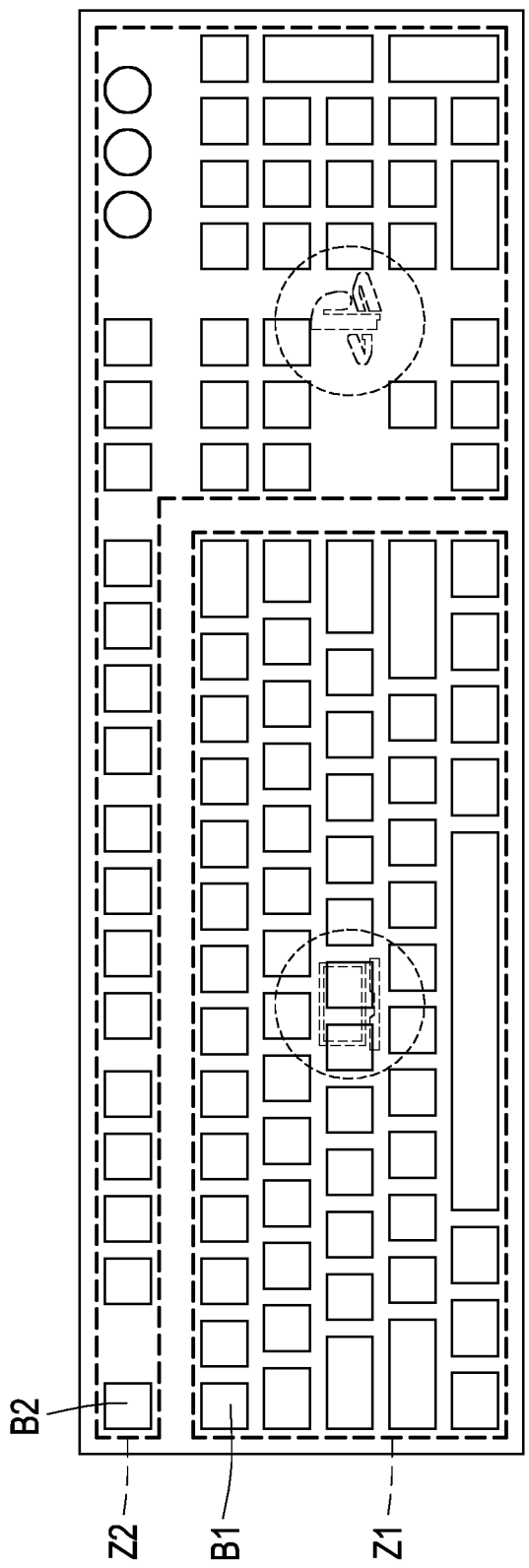
FIG. 2A to FIG. 2B are schematic diagrams of various operating devices according to embodiments of the invention.
Figure 2B:
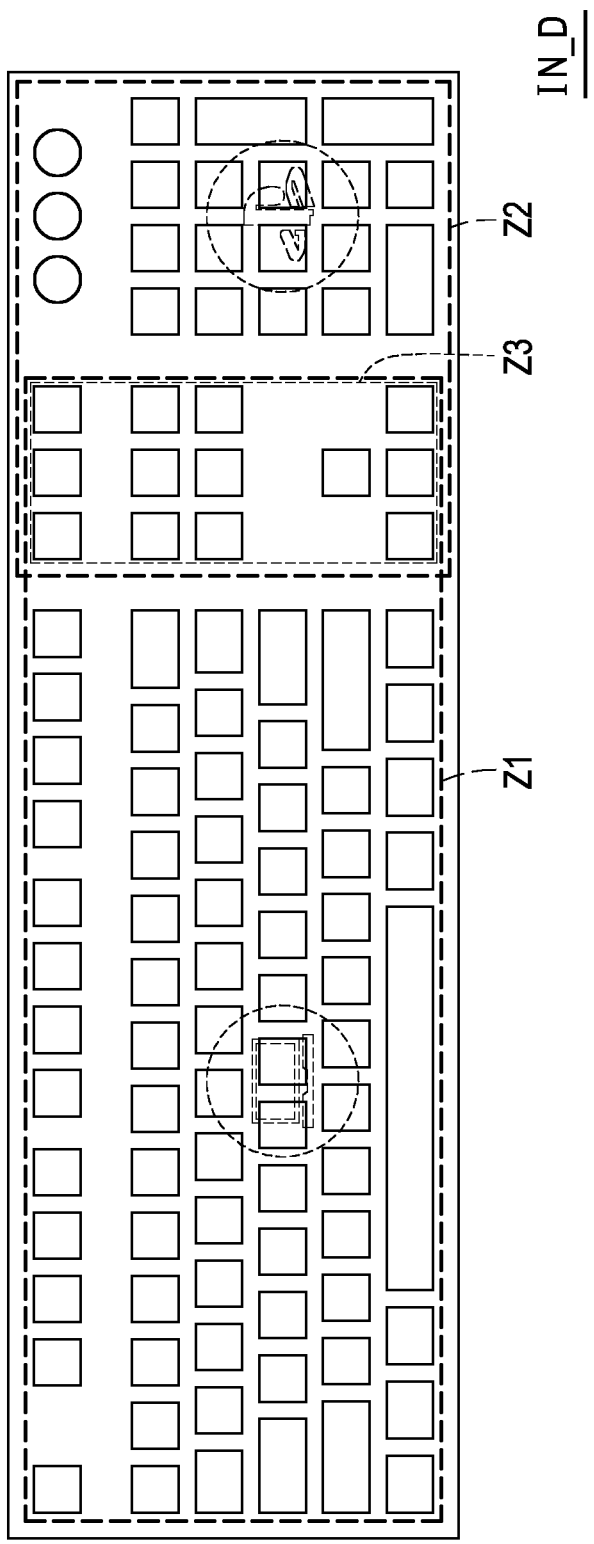

Referring to FIG. 1 and FIG. 2A to FIG. 2B, FIG. 2A to FIG. 2B are schematic diagrams of various operating devices according to embodiments of the invention. In the embodiment of FIG. 2A, the operating device IN_D is, for example, a keyboard. The operating device IN_D has a plurality of buttons B1 to B2 (i.e., keys). The number and referential numbers of the buttons B1 to B2 in the embodiment are only an example, and are not limited to the number and referential numbers shown in the embodiment.

In the embodiment, the processor 130 defines at least one button B1 and at least one button B2 as the operating area Z1 and the operating area Z2, respectively. The button B1 in the operating area Z1 may correspond to a first keyboard event. The button B1 in the operating area Z1 is used to trigger the operating signal S1 to indicate that the first keyboard event is occurred. Similarly, the button B2 in the operating area Z2 may correspond to a second keyboard event. The button B2 in the operating area Z2 is used to trigger the operating signal S2 to indicate that the second keyboard event is occurred.

The operating area Z1 may be a main keyboard zone. The operating signal S1 corresponding to the operating area Z1 may be used to control the controlled device OUT_D1 (for example, a computer). The operating area Z2 may be other zones excluding the main keyboard zone, which includes, for example, function keys, editing keys, and number keys. The operating signal S2 corresponding to the operating area Z2 may be used to control the controlled device OUT_D2 (for example, a game console).

Compared with the embodiment of FIG. 2A, in the embodiment of FIG. 2B, configuration of the operating areas Z1 and Z2 are different. In addition, the operating area Z1 and the operating area Z2 have an overlapping area Z3.

Namely, the repeatedly defined buttons in the operating areas Z1 and Z2 are defined in the overlapping area Z3. Therefore, the operating signal delivered by the overlapping area Z3 may be the operating signals S1 and S2 at the same time. The operating signal delivered by the overlapping area Z3 is used to control the controlled device OUT_D1 corresponding to the operating area Z1 and is also used to control the controlled device OUT_D2 corresponding to the operating area Z2.

It should be noted that the user may input an instruction through the overlapping area Z3 to generate a corresponding operating signal to the electronic device 100. The electronic device 100 then converts this operating signal into a control signal compatible to the controlled device OUT_D1 or OUT_D2, so that the controlled device OUT_D1 or OUT_D2 performs the corresponding operation. In this way, the electronic device 100 may improve the flexibility and convenience of controlling the multiple controlled devices OUT_D1 and OUT_D2.

Figure 3:
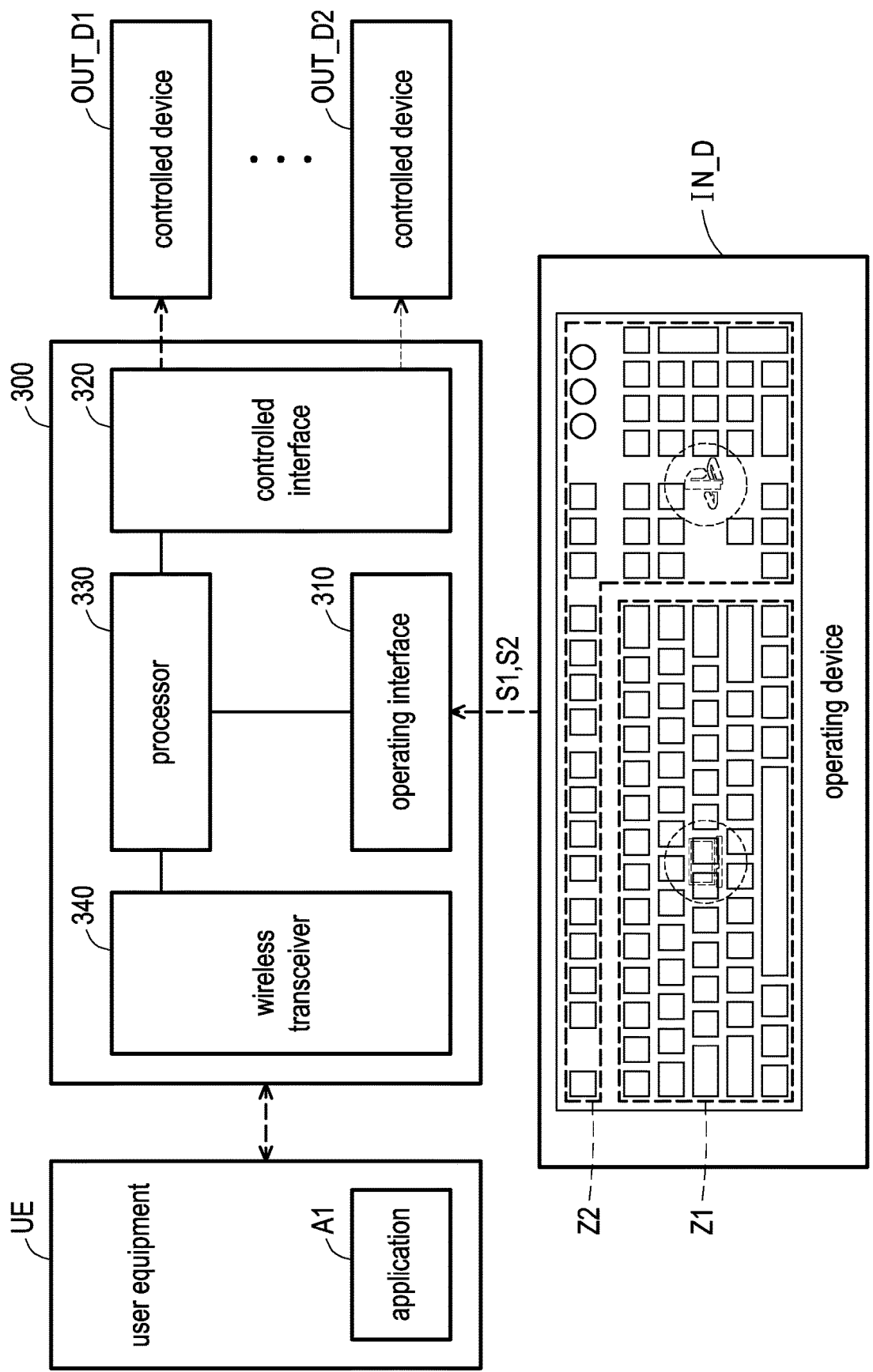
FIG. 3 is a block diagram of an electronic device according to another embodiment of the invention.

Referring to FIG. 3, FIG. 3 is a block diagram of an electronic device according to another embodiment of the invention. In the embodiment, an electronic device 300 is coupled to the operating device IN_D, a plurality of controlled devices OUT_D1-OUT_D2, and user equipment UE. The electronic device 300 includes an operating interface 310, a controlled interface 320, a processor 330, and a wireless transceiver 340.

Compared with the embodiment of FIG. 1, the wireless transceiver 340 is coupled to the processor 330. The wireless transceiver 340 is coupled to the user equipment UE, so that the electronic device 300 and the user equipment UE may communicate with each other. In the embodiment, an application A1 in the user equipment UE configures a plurality of buttons of the operating device IN_D into the operating area Z1 and the operating area Z2, or into the operating areas Z1, Z2 and at least one overlapping area Z3 as that shown in FIG. 2B.

The wireless transceiver 340 may a signal transmission component supporting a global system for mobile communication (GSM), a personal handy-phone system (PHS), a code division multiple access (CDMA) system, a wideband code division multiple access (WCDMA) system, a long term evolution (LTE) system, a worldwide interoperability for microwave access (WiMAX) system, a wireless fidelity (Wi-Fi) system or Bluetooth.

In the embodiment, a control relationship between the operating device IN_D and the controlled devices OUT_D1 and OUT_D2 may be represented by a mapping table. More specifically, information of the buttons arranged in the operating areas Z1 and Z2 is recorded in a first list in the mapping table. Conversion information of the operating signals S1 and S2 is recorded in a second list in the mapping table.

In addition, when controlling the controlled devices OUT_D1 and OUT_D2, the processor 330 may convert the operating signal S1 into a control signal compatible to the controlled device OUT_D1 by querying the first list and the second list. In addition, the processor 330 converts the operating signal S2 into a control signal compatible to the controlled device OUT_D2 by querying the first list and the second list.

Moreover, when setting or changing the definitions of the operating areas Z1 and Z2, the processor 330 may be controlled by the application A1 to set or adjust the first list. Namely, the user controls the processor 330 to set or adjust the information of the buttons defined in the operating areas Z1 and Z2 through the application A1. Similarly, the processor 330 may be controlled by the application A1 to set or adjust the second list. Namely, the user controls the processor 330 to set or adjust conversion information of the operating signals S1 and S2 through the application A1.

It should be noted that the user may set the definitions of the operating areas Z1 and Z2 of the operating device IN_D through the application A1. Namely, the definitions of the operating areas Z1 and Z2 may be changed at any time according to the settings of the application A1. In this way, the electronic device 300 has high flexibility and convenience, and may provide a smooth user experience to the user.

Referring to FIG. 3 again, in some embodiments, the electronic device 300 further includes a display driver and a display element. The display driver and the display element are controlled by the processor 330. When the processor 330 receives the operating signal S1 or S2, the processor 330 controls the display driver to drive the display element to produce a corresponding display effect. For example, when the processor 330 receives the operating signals S1 and S2 at the same time, the display driver drives the display element to emit green light and red light to respectively indicate that the controlled devices OUT_D1 and OUT_D2 are being controlled. The display element may be a display element capable of providing a display function such as a liquid crystal display (LCD), at least one light-emitting diode (LED), at least one organic light-emitting diode (OLED), etc.

In some embodiments, the processor 330 may communicate with the operating interface 310, the controlled interface 320, the wireless transceiver 340, and the display driver through different wired communication interfaces. The wired communication interfaces include: for example, universal serial bus (USB), universal asynchronous receiver and transmitter (UART), integrated circuit bus (I2C), serial peripheral interface (SPI), controller area network (CAN), recommended standard (RS) 232 or recommended standard 422, etc.

Figure 4:
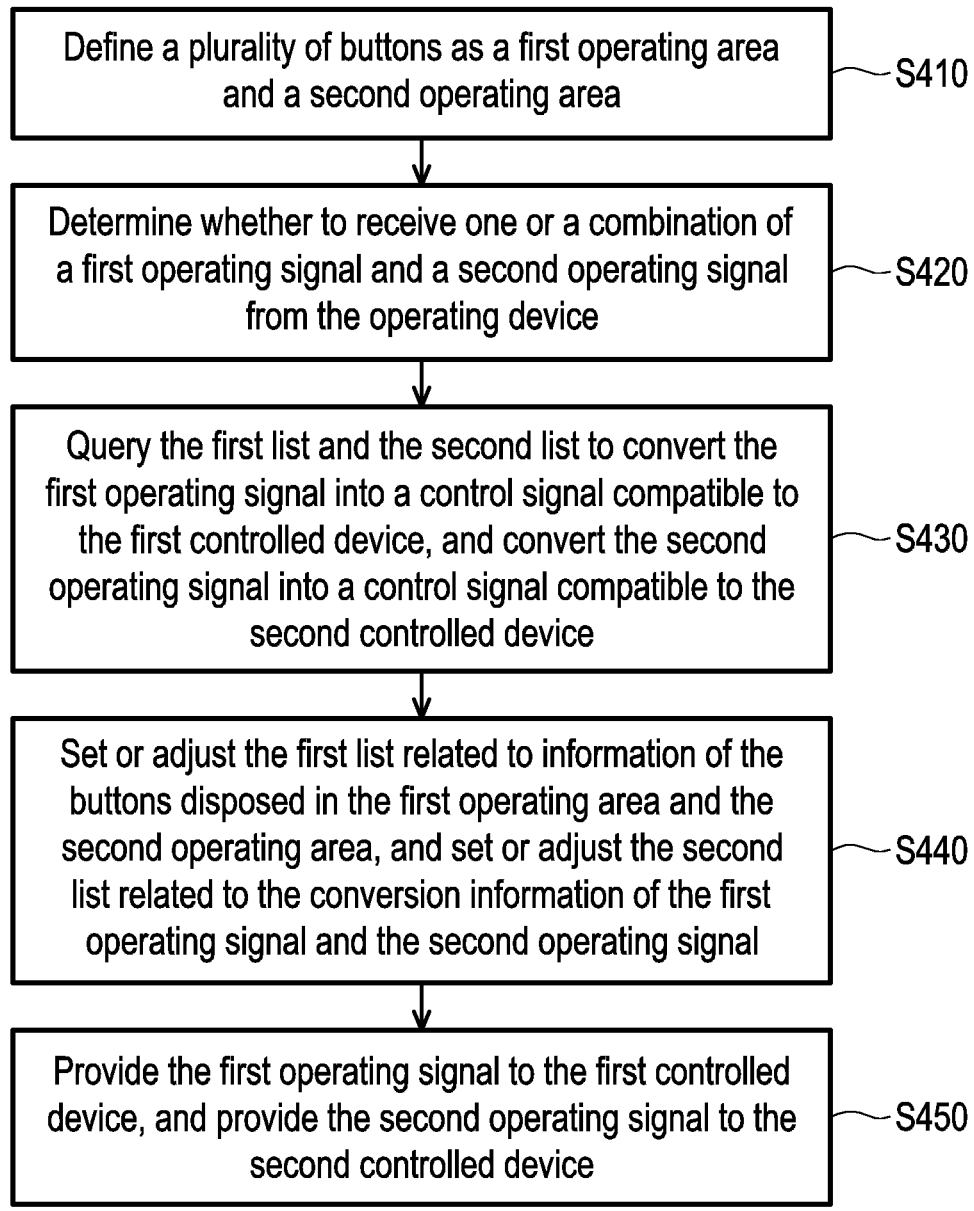
FIG. 4 is a flowchart of a method of controlling multiple pieces of equipment according to an embodiment of the invention.

Referring to FIG. 4, FIG. 4 is a flowchart of a method of controlling multiple pieces of equipment according to an embodiment of the invention. In the embodiment, the multiple pieces of equipment include a plurality of controlled devices. The control method may include the following steps. First, it is determined whether one or a combination of a first operating signal and a second operating signal is received from an operating device (step S420). The operating device has a first operating area and a second operating area. The first operating area is configured to deliver a first operating signal. The second operating area is configured to deliver a second operating signal. Referring to the embodiment of FIG. 1 at the same time, the operating device may be the operating device IN_D. The first operating area and the second operating area may be respectively the operating areas Z1 and Z2. The first operating signal and the second operating signal may be respectively the operating signals S1 and S2. Then, the first operating signal is provided to a first controlled device, and the second operating signal is provided to a second controlled device (step S450). The first operating signal is compatible and used to control the first controlled device. The second operating signal is compatible and used to control the second controlled device. Referring to the embodiment of FIG. 1 at the same time, the first controlled device and the second controlled device may be respectively the controlled devices OUT_D1 and OUT_D2.

In the embodiment, the control method further includes following steps. Before determining whether to receive the first operating signal and the second operating signal, a plurality of buttons are defined into the first operating area and the second operating area (step S410). The buttons are used to trigger the first operating signal and the second operating signal. Moreover, before determining whether to receive the first operating signal and the second operating signal, the first operating signal is received, and the second operating signal is received.

In addition, after determining whether to receive the first operating signal and the second operating signal, the first list and the second list are queried to convert the first operating signal into a control signal compatible to the first controlled device, and convert the second operating signal into a control signal compatible to the second controlled device (step S430). Referring to the embodiment of FIG. 3 at the same time, the first list and the second list may be respectively the first list and the second list of the control relationship between the operating device IN_D and the controlled devices OUT_D1 and OUT_D2. Then, the first list related to information of the buttons arranged in the first operating area and the second operating area is set or adjusted, and the second list related to information of the conversion information of the first operating signal and the second operating signal is set or adjusted (step S440).

Implementation details of the above steps have been described in detail in the aforementioned embodiments and implementation methods, which are not repeated.

In summary, the electronic device and the method of controlling multiple pieces of equipment in the embodiments of the invention divide a plurality of button zones on the operating device (for example, an input device with multiple buttons, such as a keyboard, a mouse, etc.) into multiple operating areas, so that the operating signals generated by these operating areas on the operation device are respectively provided to the corresponding controlled devices through conversion of the electronic device, so as to control these hosts to perform different operations at the same time. For example, the user may press a button in the first operating area to control the first controlled device to move a game character, and simultaneously press a button in the second operating area to control the second controlled device to play/pause a multimedia video. In this way, the embodiments of the invention may improve the use efficiency of controlling multiple controlled devices, and may improve the user's operation fluency to enhance the user experience. In some embodiments, the overlapping area where different operating areas are overlapped each other may be used to control multiple corresponding controlled devices, so that the embodiments of the invention have good flexibility and convenience. In some embodiments, the user may set or adjust the configuration of the operating areas through an application, so that the embodiments of the invention have good flexibility and convenience.

It will be apparent to those skilled in the art that various modifications and variations can be made to the disclosed embodiments without departing from the scope or spirit of the invention. In view of the foregoing, it is intended that the invention covers modifications and variations provided they fall within the scope of the following claims and their equivalents.

What is claimed is:

1. An electronic device, coupled to an operating device, a first controlled device, and a second controlled device, and comprising:
an operating interface coupled to the operating device, wherein the operating device comprises a first operating area and a second operating area, the first operating area is configured to deliver a first operating signal, and the second operating area is configured to deliver a second operating signal; and
a controlled interface coupled to the first controlled device and the second controlled device, wherein the first controlled device is controlled by the first operating signal, and the second controlled device is controlled by the second operating signal.

2. The electronic device as claimed in claim 1, further comprising:
a processor coupled to the operating interface and the controlled interface,
wherein the processor receives the first operating signal through the operating interface and converts the first operating signal into a control signal compatible to the first controlled device, and receives the second operating signal through the operating interface and converts the second operating signal into a control signal compatible to the second controlled device,
wherein there is a first operating signal transmission path between the processor and the first controlled device, and a second operating signal transmission path between the processor and the second controlled device, the operating device controls both the first controlled device and the second controlled device through the first operating signal transmission path and the second operating signal transmission path.

3. The electronic device as claimed in claim 2, wherein the operating device comprises a plurality of buttons, the processor defines the plurality of buttons as the first operating area and the second operating area, and the plurality of buttons are configured to trigger the first operating signal and the second operating signal.

4. The electronic device as claimed in claim 3, wherein information of the buttons defined as the first operating area and the second operating area is recorded in a first list, conversion information of the first operating signal and the second operating signal is recorded in a second list, and the electronic device further comprises:
a wireless transceiver coupled to the processor,
wherein the processor converts the first operating signal into the control signal compatible to the first controlled device and converts the second operating signal into the control signal compatible to the second controlled device by querying the first list and the second list, and the processor is controlled by user equipment thereby to set or adjust the first list related to the information of the buttons defined as the first operating area and the second operating area and set or adjust the second list related to the conversion information of the first operating signal and the second operating signal.

5. The electronic device as claimed in claim 1, wherein the first operating area and the second operating area comprise an overlapping area, and an operating signal delivered by the overlapping area is configured to control both the first controlled device and the second controlled device.

6. A method of controlling multiple pieces of equipment, adapted for an electronic device coupled to an operating device, a first controlled device, and a second controlled device, the method comprises:
determining whether to receive one or a combination of a first operating signal and a second operating signal from the operating device, wherein the operating device comprises a first operating area and a second operating area, the first operating area is configured to deliver the first operating signal, and the second operating area is configured to deliver the second operating signal; and providing the first operating signal to the first controlled device, and providing the second operating signal to the second controlled device, wherein the first operating signal is compatible and configured to control the first controlled device, and the second operating signal is compatible and configured to control the second controlled device.

7. The method of controlling the multiple pieces of equipment as claimed in claim 6, further comprising:

receiving the first operating signal and converting the first operating signal into a control signal compatible to the first controlled device, and receiving the second operating signal and converting the second operating signal into a control signal compatible to the second controlled device, wherein there is a first operating signal transmission path between the electronic device and the first controlled device, and a second operating signal transmission path between the electronic device and the second controlled device, and the operating device controls both the first controlled device and the second controlled device through the first operating signal transmission path and the second operating signal transmission path.

8. The method of controlling the multiple pieces of equipment as claimed in claim 6, wherein the operating device comprises a plurality of buttons, and the method of controlling the multiple pieces of equipment further comprises:

defining the plurality of buttons as the first operating area and the second operating area, wherein the plurality of buttons are configured to trigger the first operating signal and the second operating signal.

9. The method of controlling the multiple pieces of equipment as claimed in claim 8, wherein information of the buttons disposed in the first operating area and the second operating area is recorded in a first list, and conversion information of the first operating signal and the second operating signal is recorded in a second list, wherein the method of controlling the multiple pieces of equipment further comprises:

querying the first list and the second list to convert the first operating signal into a control signal compatible to the first controlled device, and convert the second operating signal into a control signal compatible to the second controlled device; and setting or adjusting the first list related to the information of the buttons disposed in the first operating area and the second operating area, and setting or adjusting the second list related to the conversion information of the first operating signal and the second operating signal controlled by user equipment.

10. The method of controlling the multiple pieces of equipment as claimed in claim 6, wherein the first operating area and the second operating area comprise an overlapping area, and an operating signal delivered by the overlapping area is configured to control both the first controlled device and the second controlled device.

\* \* \* \* \*